United States Patent [19]

Giere et al.

[11] Patent Number: 5,087,227
[45] Date of Patent: Feb. 11, 1992

[54] HYDROSTATIC TRANSAXLE AND BRAKE ARRANGEMENT THEREFOR

[75] Inventors: David W. Giere, Chaska; Sven B. Gafvert, Eden Prairie, both of Minn.

[73] Assignee: Eaton Corporation, Cleveland, Ohio

[21] Appl. No.: 531,667

[22] Filed: Jun. 1, 1990

[51] Int. Cl.$^5$ .............................................. F16H 47/04
[52] U.S. Cl. ...................................... 475/72; 188/72.7; 60/435; 74/503; 475/270; 475/900
[58] Field of Search ...................... 74/503; 475/72, 83, 475/269, 270, 900; 188/18 A, 71.4, 72.8, 72.7, 72.9; 60/435, 439

[56] References Cited

U.S. PATENT DOCUMENTS

| | | | |
|---|---|---|---|
| 1,645,975 | 10/1927 | Tape | 188/72.8 |
| 1,843,490 | 2/1932 | Spase | 188/72.8 |
| 2,953,040 | 9/1960 | Christenson et al. | 475/900 X |
| 3,059,731 | 10/1962 | Gancel et al. | 188/72.7 X |
| 3,155,047 | 11/1964 | Keel | 103/161 |
| 3,765,183 | 10/1973 | Baurle | 60/491 |
| 3,877,537 | 4/1975 | Ohms et al. | 180/6.3 |
| 3,905,251 | 9/1975 | Greene | 475/72 |
| 4,696,164 | 9/1987 | Giere | 74/665 T X |
| 4,845,949 | 7/1989 | Shivvers et al. | 60/436 |

Primary Examiner—Leslie A. Braun
Assistant Examiner—Benjamin Levi
Attorney, Agent, or Firm—L. J. Kasper

[57] ABSTRACT

A hydrostatic transaxle is disclosed of the type having a central manifold (13) and right and left motor axle assemblies (15, 17). Each motor axle assembly includes a fluid motor (35) and a speed reduction gear set (51). The manifold defines a pair of aligned openings (81R, 81L) and disposed therein is a pair of elongated brake actuation members (83R, 83L), each member being axially moveable in its opening away from a central reference plane (RP). A cam means (95) defines right and left cam surfaces (107R, 107L) engaging the brake actuation members. Movement of the cam means forces the actuation members axially outward, until each engages friction pad (109), providing braking of a reaction plate (115) between the friction pad and a back up plate (119). The disclosed braking arrangement is simple and inexpensive, and achieves braking upstream of the reduction gear set, thus requiring less braking torque than would be required in the case of a conventional wheel brake. Also disclosed is an embodiment (FIG. 7) in which the brake arrangements in the right and left motor axle assemblies may be actuated independently of each other.

15 Claims, 6 Drawing Sheets

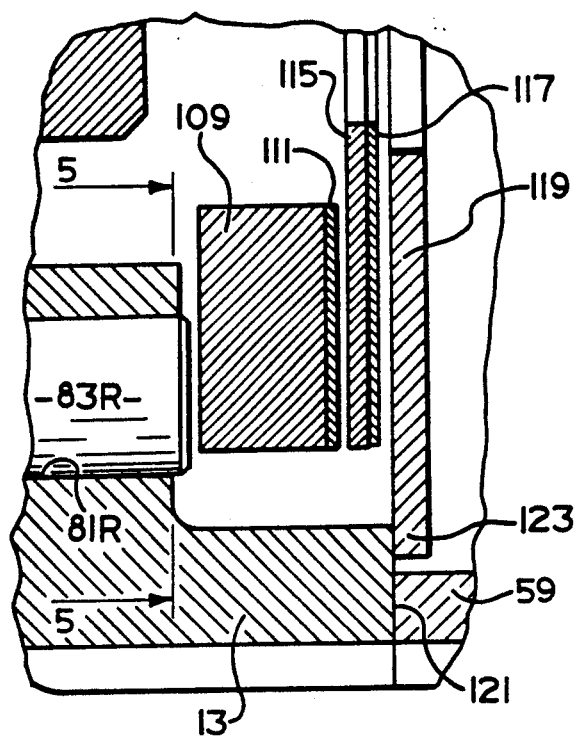
FIG. 4
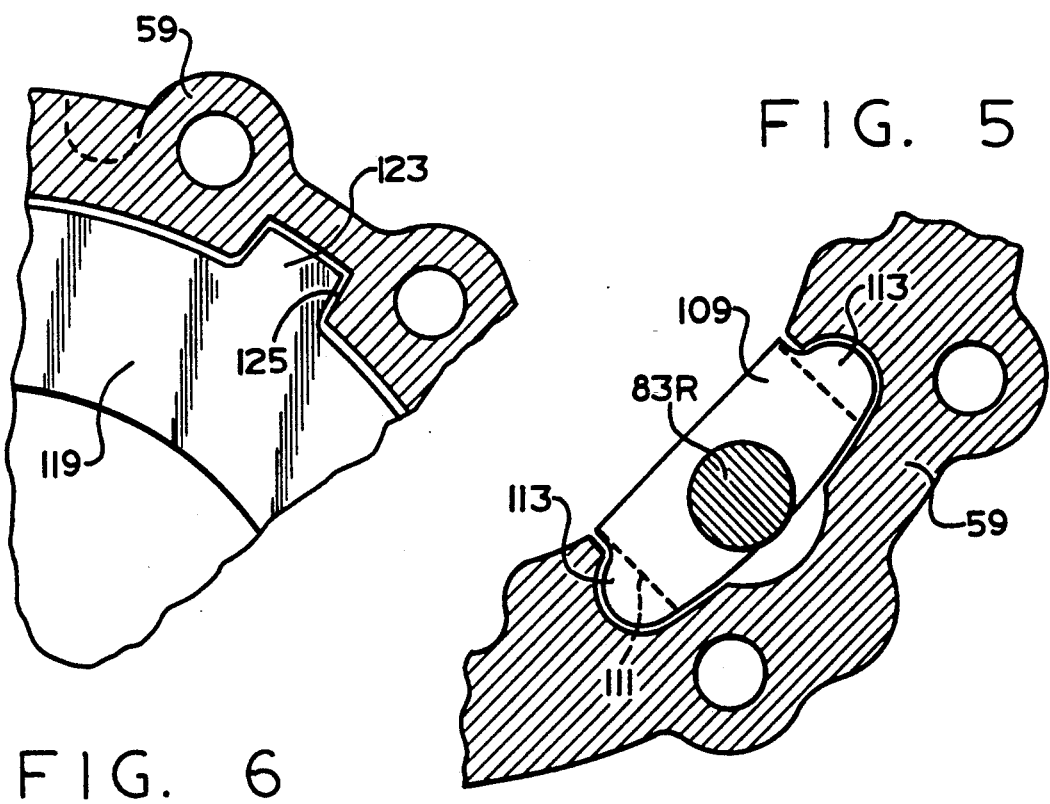
FIG. 5
FIG. 6

HYDROSTATIC TRANSAXLE AND BRAKE ARRANGEMENT THEREFOR

BACKGROUND OF THE DISCLOSURE

The present invention relates to hydrostatic transaxle assemblies, and more particularly, to such assemblies which are used as the sole means of propulsion for the wheels of a vehicle.

Certain vehicles, such as lawn and garden tractors, have used hydrostatic transaxle assemblies for transmitting engine torque to a pair of ground-engaging drive wheels to propel the vehicle. A typical transaxle assembly which has been used commercially includes a variable displacement hydraulic pump, such that the ratio of pump output flow to pump input speed (engine speed) may be infinitely varied by the vehicle operator. This ability to infinitely vary the output-input ratio, without interrupting torque transmission, makes such transaxle assemblies preferred over conventional clutch and gear transmissions for vehicles such as lawn and garden tractors.

Vehicles which have utilized hydrostatic transaxles have sometimes been equipped with "wheel brakes", i.e., a pair of brakes, with one located at the end of each axle shaft, adjacent its respective wheel. There are several disadvantages of the typical wheel brake arrangement, one of which relates to the amount of control linkage required to actuate two axially spaced apart wheel brakes from a single brake pedal. Another problem relates to the fact that the braking action is being applied at a location in the power path where the speed of rotation is at a minimum, and the torque being transmitted is at a maximum. As a result, a greater amount of braking torque is required, thus making it more difficult to achieve the desired durability of the various components of the braking mechanism.

A brake mechanism for a hydrostatic transaxle of the general type to which the present invention relates is illustrated and described in U.S. Pat. No. 4,696,164, assigned to the assignee of the present invention. In the referenced patent, there is illustrated a cam-ramp and friction clutch mechanism which permits the vehicle operator to select among normal operation, operation in a locking differential mode, and a brake mode of operation. Hydrostatic transaxles including the mechanism illustrated and described in the referenced patent have been sold commercially by the assignee of the present invention. Although the locking differential and braking mechanism of the referenced patent performs in a satisfactory manner, it does add substantial structure, complication, and expense to the transaxle assembly.

SUMMARY OF THE INVENTION

Accordingly, it is an object of the present invention to provide an improved braking mechanism for use in a hydrostatic transaxle wherein the braking mechanism is relatively simpler and less expense than the prior art braking mechanisms described previously.

It is a more specific object of the present invention to provide an improved braking mechanism for use in a hydrostatic transaxle assembly, wherein the braking mechanism is built into the transaxle assembly, such that the braking arrangement does not require any noticeable increase in the size of the transaxle assembly.

It is another object of the present invention to provide an improved braking arrangement for use in a hydrostatic transaxle of the type wherein each axle assembly includes a fluid motor and a speed reduction gear set, wherein the braking arrangement is effective upstream of the reduction gear set to minimize the amount of braking torque required.

The above and other objects of the present invention are accomplished by the provision of a hydrostatic transaxle assembly for use on a vehicle having a source of motive power, a fluid pump driven by the source of power, and a pair of driven wheels. The transaxle assembly comprises a manifold means and first and second motor assemblies. The manifold means defines a fluid inlet, adapted to be in fluid communication with a port of the fluid pump, the manifold means further defining a fluid outlet adapted to be in communication with another port of the fluid pump. Each of the first and second motor assemblies includes a rotary fluid pressure actuated device adapted to receive pressurized fluid from the fluid inlet and to return exhaust fluid to the fluid outlet. Each of the motor assemblies further includes an output member having a speed of rotation representative of the speed of rotation of the respective motor assembly. Each of the motor assemblies includes an axle shaft adapted to transmit torque from the first and second motor assemblies to the pair of driven wheels. The manifold means defines a central reference plane, and the manifold means and the first and second motor assemblies are disposed oppositely and generally symmetrically relative to the central reference plane.

The improved hydrostatic transaxle assembly is characterized by each of the first and second motor assemblies including a friction brake member operably associated with the output member and disposed adjacent thereto. The manifold means defines first and second aligned openings, disposed generally symmetrically relative to the central reference plane. First and second elongated brake actuation members are disposed in the first and second aligned openings, respectively, each of the brake actuation members being axially moveable in its respective opening, away from the central reference plane. Each of the motor assemblies includes means operable in response to the axial movement of its respective brake actuation member for engaging its respective friction brake member, thereby braking rotation of its respective output member. A cam means is disposed adjacent the central reference plane and defines first and second cam surfaces adapted to be in engagement with the axially inner ends of the first and second brake actuation members, respectively, the cam means being moveable between a first position in which the brake actuation member is out of engagement with the engaging means, and a second position in which the brake actuation member is in engagement with the engaging means.

BRIEF DESCRIPTION OF THE DRAWINGS

FIG. 3A is an enlarged, axial cross-section, on a plane perpendicular to that of FIG. 3, and taken on line 3A—3A of FIG. 3, illustrating in greater detail the cam arrangement of the present invention.

FIG. 4 is a fragmentary, enlarged, axial cross-section, like FIG. 3, but showing the friction brake out of engagement.

FIG. 5 is a fragmentary, transverse cross-section, taken on line 5—5 of FIG. 4, but on a smaller scale.

FIG. 6 is a fragmentary, transverse cross-section, on approximately the same scale as FIG. 5, showing the back-up plate and axle housing of the present invention.

DESCRIPTION OF THE PREFERRED EMBODIMENT

Figure 1:
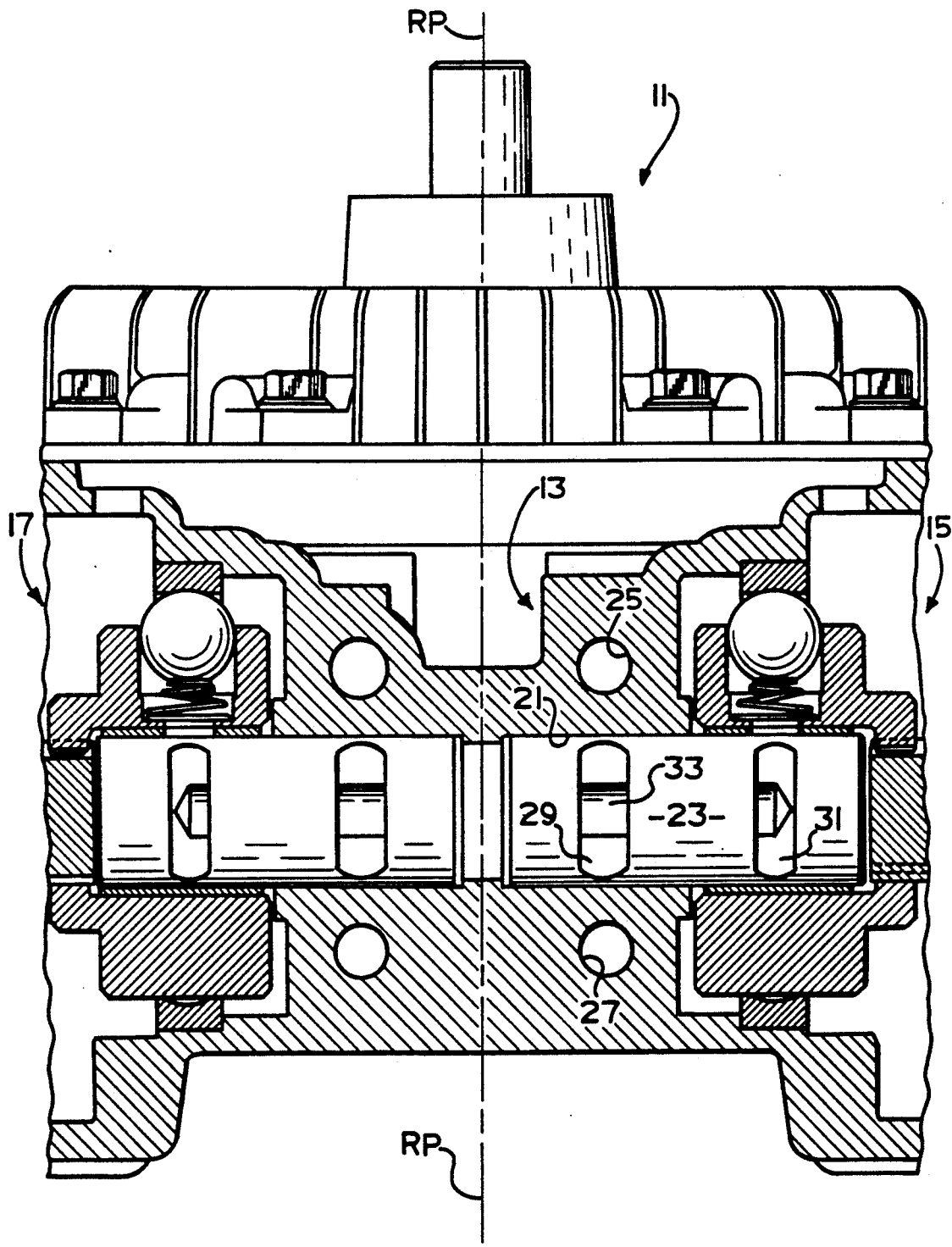
FIG. 1 an axial cross-section showing the central portion of a transaxle assembly of the type with which the present invention may be utilized.
Figure 2:
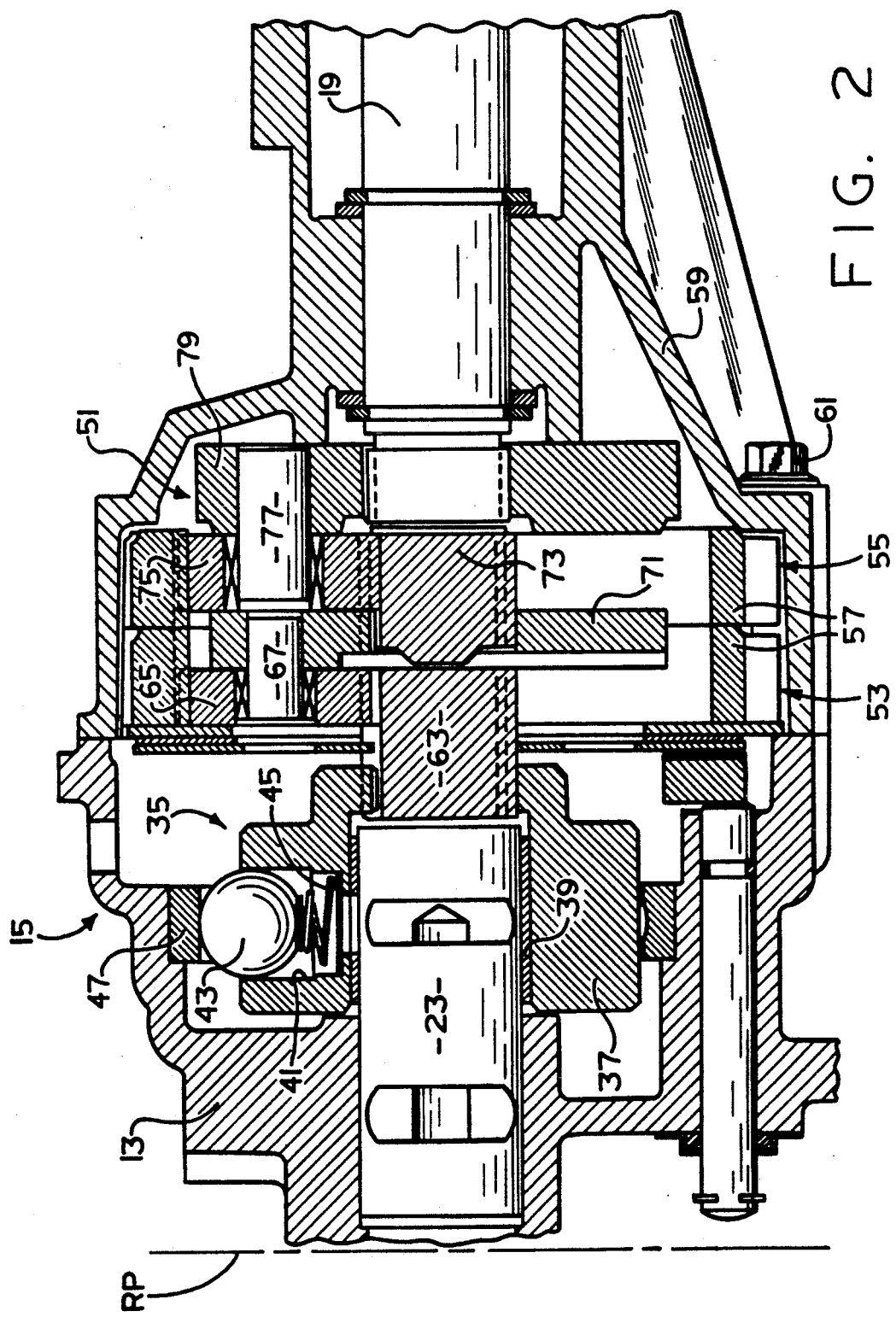
FIG. 2 is an axial cross-section, on a slightly larger scale than FIG. 1, and on a different plane than FIG. 1, showing most of the remainder of one end of the transaxle assembly of the invention, but excluding the brake handle.

Referring now to the drawings, which are not intended to limit the invention, FIGS. 1 and 2 illustrate a hydrostatic transaxle of the general type illustrated and described in U.S. Pat. No. 4,696,164, assigned to the assignee of the present invention, and incorporated herein by reference. The above-incorporated patent also illustrates and describes a typical application of a hydrostatic transaxle to a vehicle such as a garden tractor, and therefore, no such description will be included herein.

The transaxle assembly includes a variable displacement radial ball pump, generally designated 11, a central manifold portion 13, and right and left motor axle assemblies 15 and 17, respectively. Only a small portion of each motor axle assembly is illustrated (in FIGS. 1 and 3), but the motor axle assemblies 15 and 17 are preferably identical, although arranged in a mirror image with respect to each other about a central reference plane RP. In the subject embodiment, the reference plane RP passes through the axis of rotation of the pump 11, and the manifold portion 13 is generally symmetrical relative to the reference plane RP. Therefore, only the right motor axle assembly 15 will be described in detail, it being understood that the left motor axle assembly 17 is substantially identical in construction and operation.

Referring now primarily to FIG. 2, extending out of the right motor axle assembly 15 is an axle shaft 19 which, as is well known in the art, extends into and is drivingly connected to a drive wheel (not shown). Typically, the drive wheels driven by the axle shafts 19 comprise the sole source of propulsion for the vehicle, and the transaxle assembly comprises the sole source of propulsion for the drive wheels.

Referring again primarily to FIG. 1, the manifold portion 13 defines an axially-extending bore 21 in which is received a non-rotatable pintle member 23. The manifold casting 13 also defines a fluid inlet 25 and a fluid outlet 27. The inlet 25 receives pressurized fluid from an outlet port of the pump 11, and the fluid outlet 27 communicates low pressure exhaust fluid back to an inlet port of the pump 11, as is well known in the art.

As is also well known to those skilled in the art of radial piston (radial ball) pumps and motors, the pintle member 23 defines a slot-like fluid passage 29 which receives high pressure fluid from the fluid inlet 25, and communicates the high pressure fluid to a motor timing slot 31 by means of an axially-extending bore 33. On the opposite side of the pintle assembly 23 is another, similar arrangement of ports, passages, and timing slots which is able to communicate low pressure, exhaust fluid to the fluid outlet 27.

Referring again primarily to FIG. 2, disposed about the pintle assembly 23 is a motor assembly, generally designated 35, and including a rotor 37 which is rotatably disposed about the pintle 23 by means of a journal sleeve 39. The rotor 37 defines a plurality of radial cylinders 41, and in each of the cylinders 41 is a piston, which in the subject embodiment, comprises a ball member 43. Each of the balls 43 is biased by means of a compression spring 45 into engagement with an inner surface of a race 47 which is pressed into place within a stepped opening in the manifold casting 13. The manner in which pressurized fluid is communicated through the timing slots 31 into each of the cylinders 41, thus causing radially outward movement of the balls 43 and causing rotation of the rotor 37, is well known to those skilled in the art and will not be described further herein.

Referring still primarily to FIG. 2, each of the motor axle assemblies 15 and 17 also include a speed reduction gear set, generally designated 51. The gear set 51 is preferably included because the motor assembly 35 is of the high-speed, low-torque variety, such that the gear set 51 is required to be able to transmit the appropriate speed and torque to the axle shaft 19. The gear set 51 includes primary and secondary planetary gear sets, generally designated 53 and 55, respectively. The reduction gear set 51 further includes a pair of ring gears 57 which are disposed about the inner periphery of an axle housing 59, the housing 59 being attached to the manifold casting 13 by means of a plurality of bolts 61.

The primary planetary gear set 53 includes a sun gear 63 which is in splined engagement, at its left end in FIG. 2, with the rotor 37. The sun gear 63 is in toothed engagement with a plurality of planet pinion gears 65, which are also in toothed engagement with the ring gear 57, as is well known in the art. Each of the pinion gears 65 is journaled for rotation on a pinion shaft 67 (only 1 of the pinion gears 65 and pinion shafts 67 being shown in FIG. 2). The pinion shafts 67 are received in a planet carrier 71 which is internally splined to a coupling member 73, which serves as both the output for the primary planetary set 53, and as the input sun gear for the secondary planetary gear set 55.

In toothed engagement with the right end of the sun gear 73 is a plurality of planet pinion gears 75, which are also in toothed engagement with the ring gear 57. Each of the planet pinion gears 75 is journaled on a pinion shaft 77, with all of the pinion shafts 77 being received in a planet carrier 79. The planet carrier 79 includes a set of internal teeth in toothed engagement with the left end of the axle shaft 19.

To summarize briefly, the high-speed, low-torque output of the radial ball motor 35 is transmitted into a low-speed, high-torque output of the axle shaft 19 by means of the primary and secondary planetary gear sets 53 and 55, respectively. It should be understood that the present invention is not limited to any particular arrangement of fluid motor and speed reduction gearing, and in fact, it is not even an essential feature of the present invention that each motor axle assembly include a speed reduction gear set. However, the particular combination of the motor assembly 35 and the speed reduction gear set 51 illustrated and described herein provides an operating environment in which the brake arrangement of the present invention is especially advantageous, and at the same time, can be implemented in a manner which is especially simple and inexpensive.

Brake Arrangement

Figure 3:
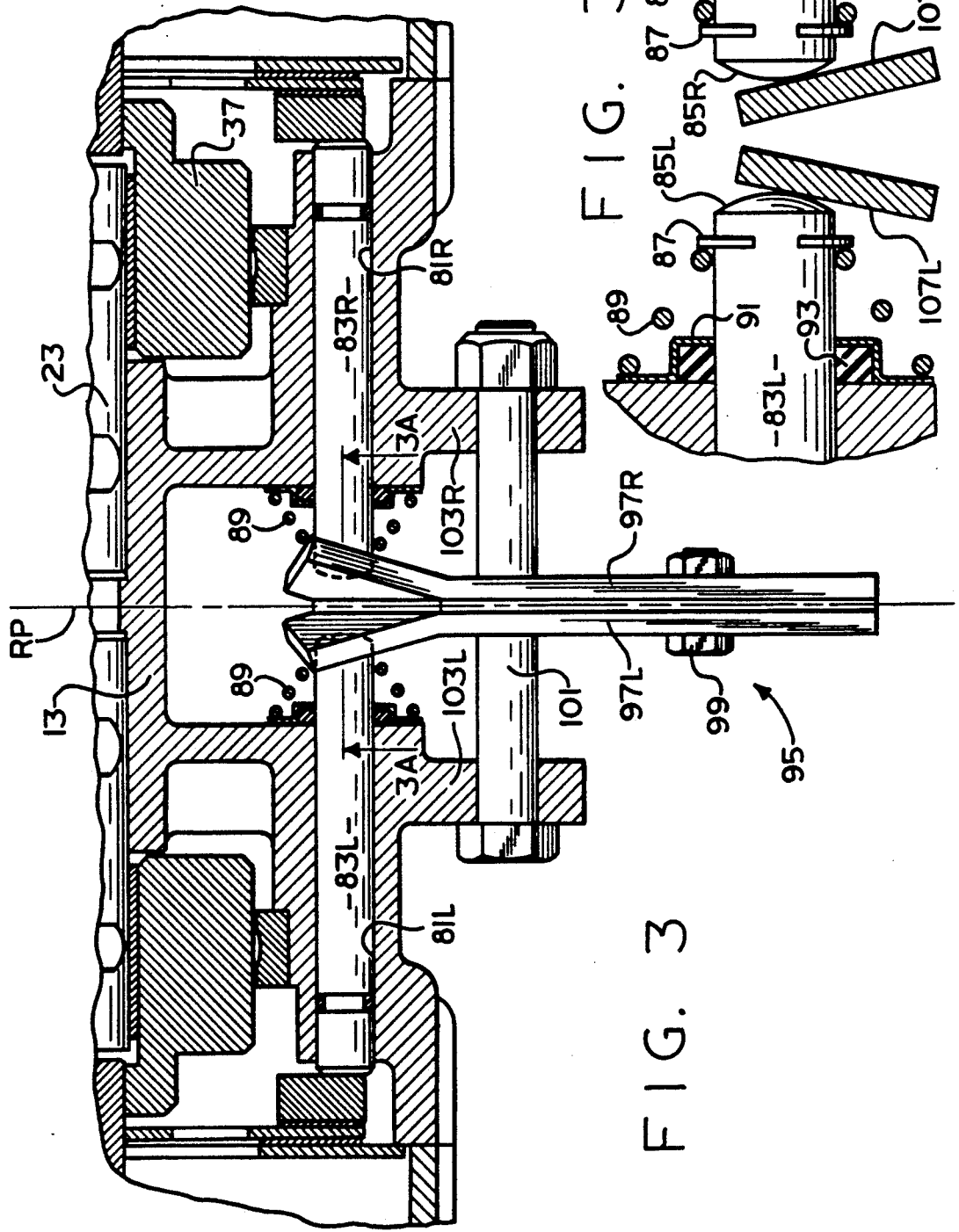
FIG. 3 is a fragmentary, axial cross-section, on the same scale and on the same plane as FIG. 2, but including the brake handle.

Referring now primarily to FIG. 3, the brake arrangement of the present invention will be described in detail. The portion of the manifold casting 13 in which the brake arrangement is located is also symmetrical about the central reference plane RP, for reasons which will become apparent subsequently. In connection with the subsequent description of the braking arrangement, various elements are duplicated on opposite sides of the reference plane RP, and such elements will bear a reference numeral accompanied by either the letter "R" or the letter "L", to designate that the particular element is the one on the right side, or on the left side, respectively, of the reference plane RP.

The manifold casting 13 defines a pair of aligned, elongated openings 81R and 81L. Preferably, for ease of manufacture, each of the openings 81R and 81L has a circular cross-section, and received in the openings 81R and 81L are elongated actuation members 83R and 83L. As may best be seen in FIG. 3, the members 83R and 83L are also preferably symmetrical relative to the reference plane RP, for reasons which will become apparent subsequently.

Referring now to FIG. 3, in conjunction with the enlarged view of FIG. 3A, it may be seen that the actuation members 83R and 83L include axially inner end portions 85R and 85L, respectively. In engagement with each of the end portions is a snap ring 87 against which is seated the axially inner, smaller diameter portion of a compression spring 89, the axially outer, larger diameter end of the spring 89 being seated against a stamped retainer member 91. Disposed between the retainer 91 and the adjacent surface of the manifold casting 13 is a dust seal 93, the function of which is to wipe the outer surface of the actuation members 83R and 83L, as they move axially within the openings 81R and 81L, respectively.

Disposed between the actuation members 83R and 83L is a cam and handle assembly, generally designated 95, comprising a pair of handle members 97R and 97L which, in the embodiment of FIG. 3, are fixedly attached to each other by means of a bolt and nut assembly 99. The cam and handle assembly 95 is mounted to pivot about the axis of an elongated bolt 101 which passes through circular openings in the handle members 97R and 97L, and is free to move axially relative to the bolt 101. The bolt also passes through openings in a pair of casting extensions 103R and 103L. The handle members 97R and 97L define, respectively, cam surfaces 107R and 107L, which are in engagement with the inner end portions 85R and 85L, respectively. As may best be seen by referring to FIG. 3A, as the cam and handle assembly 95 is rotated about the axis of the bolt 101, the cam surfaces 107R and 107L move upward in FIG. 3A), thus moving the actuation members 83R and 83L axially outward, in opposition to the biasing force of the springs 89.

In connection with the subsequent description, each new element introduced will bear only a reference numeral, not accompanied by an "R" or an "L", but it will be understood that the elements illustrated in FIGS. 4, 5 and 6 as part of the right motor axle assembly 15 are duplicated in the left motor axle assembly 17.

Referring initially to FIG. 4, the axially outer end of the actuation member 83R is disposed to be in engagement with a friction pad 109, which includes a thin layer of any suitable friction material 111. The friction material 111 is preferably of the type which functions well as a wet friction material, in view of the fact that most of the interior chamber defined by the manifold 13 is filled with hydraulic fluid. As may best be seen in FIG. 5, the friction pad 109 comprises a circumferentially-elongated member including a pair of curved end portions 113, each of which is received within a mating, but slightly oversized opening defined by the manifold casting 13. Thus, the friction pad 109 is restrained both circumferentially and radially by the manifold 13. Referring again to FIG. 4, disposed adjacent the friction pad 109 is reaction plate, which is splined (see FIG. 2) to the sun gear 63 for rotation therewith. Bonded to the axially outer surface (right side in FIG. 4) of the reaction plate 115 is a layer of friction material 117, which preferably may consist of the same type of friction material as the friction material 111. Disposed axially outward (to the right in FIG. 4) of the reaction plate 115 is a back-up plate 119 which is trapped axially between an adjacent end surface 121 of the manifold casting 13 and the planet pinion gears 65.

Referring now to FIGS. 4 and 6, the back-up plate 119 includes a plurality of tabs 123 (although only one of the tabs is shown in FIG. 6). Each of the tabs 123 is within a mating, but slightly oversized opening 125 defined by the axle housing 59. The tabs 123 ensure that the back-up plate 119 remains rotationally fixed relative to the axle housing 59, and therefore, stationary.

Operation

When the cam and handle assembly 95 is rotated as was described previously in connection with FIG. 3A, each of the actuation members 83R and 83L is forced axially outward. The result is that each of the actuation members engages its respective friction pad 109, forcing it axially outward into engagement with the reaction plate 115, and moving it axially outward slightly and into engagement with the back-up plate 119. Typically, the force of braking engagement is sufficient to separate the back-up plate slightly from the end surface 121 (see FIG. 3), because the adjacent speed reduction gear set 51 is of the "floating" type. The frictional engagement of the reaction plate 115 between the friction pad 109 and the back-up plate 119 retards rotation of the reaction plate 115, and therefore, retards or brakes rotation of the sun gear 63 and subsequently, the axle shaft 19.

If the vehicle is at rest, with no pressurized fluid being directed to the motor assembly 35, when the cam and handle assembly 95 is moved to the engaged position, the reaction plate 115 is not rotating, and the brake arrangement illustrated and described herein functions as a "static" or parking brake, which is the primary intended function for the braking arrangement, i.e., the minimum function which it must be able to accomplish.

If the vehicle is either coasting, without pressurized fluid being communicated to the motor assembly 35, or is actually operating under power, with the motor 35 being driven by pressurized fluid, when the cam and handle assembly 95 is moved to the engaged position, the reaction plate 115 is rotating, and the brake arrangement then functions as a "dynamic" brake. It will be understood by those skilled in the art that a mechanism which is used as a dynamic brake would typically require the application of a greater axial outward force on the friction pads 109, and would typically require that the reaction plate 115 and its spline connection to the sun gear 63 be somewhat sturdier than if the mechanism were being used only as a parking brake. In addition, using the mechanism as a dynamic brake would typically require a more durable, heat resistant material for the friction material 111 and 117.

It may be seen that the present invention provides a very simple, inexpensive brake arrangement which is especially advantageous when used in a transaxle assembly of the type having a central manifold and a pair of motor axle assemblies which are disposed fairly near a central reference plane, and are arranged in a mirror image with respect to each other about the reference plane. The brake arrangement of the present invention simplifies the required linkage from the input (brake pedal) to the brake arrangement, as compared to the prior art arrangement with a separate wheel brake located adjacent each wheel.

The present invention also provides a brake arrangement which requires less braking torque than the typical, prior art wheel brake arrangement. The reaction plate 115 is in splined engagement with the sun gear 63 which is rotating at the same speed and torque as the rotor 37, but because the reaction plate 115 is located "upstream" of the reduction gear set 51, the reaction plate rotates at a speed which is a multiple of the speed of rotation of the axle shaft 19, but rotates at a torque which is only a fraction of that of the axle shaft 19.

FIG. 7 Embodiment

The embodiment of FIGS. 1 through 6 was illustrated and described based upon the principle of actuating the cam and handle assembly 95 with a single input device (such as brake pedal), thereby applying the brakes, approximately equally, and at the same time, in each of the motor axle assemblies 15 and 17.

Figure 7:
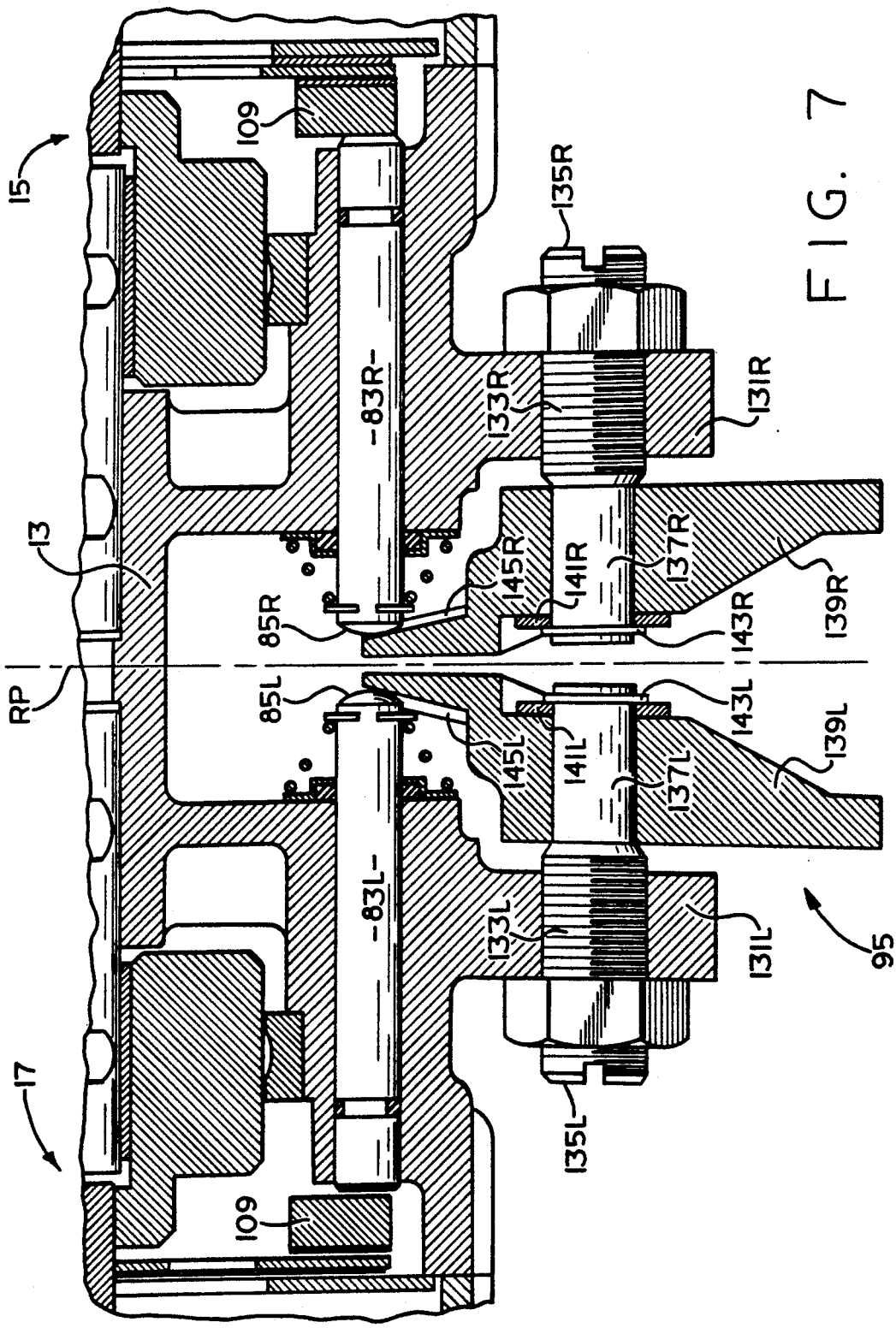
FIG. 7 is a view, similar to FIG. 3, illustrating the use of the present invention in a brake-steer mode with one brake engaged and the other disengaged.

However, in certain applications, it is desirable to be able to apply either of the brakes, independent of the other. Referring now to FIG. 7, there is illustrated an alternative embodiment of the present invention in which such independent brake actuation is possible, thus resulting in operation in a "brake-steer" mode. In FIG. 7, it may be seen that the brake in the motor axle assembly 15 is engaged, whereas the brake in the motor axle assembly 17 is disengaged, which would result in a right turn condition of the vehicle.

In the embodiment of FIG. 7, those elements which are the same or substantially the same as in the embodiment of FIG. 1 through 6 bear the same reference numeral, but those elements which are substantially different bear a reference number in excess of 130. In view of the symmetry of the mechanism shown in FIG. 7, only the structure associated with the motor axle assembly 15 will be described specifically, it being understood that the structure associated with the motor axle assembly 17 is substantially identical, but arranged in a mirror image.

The manifold casting 13 includes a casting extension 131R which defines a threaded opening having, enthreaded engagement therewith, an enlarged, threaded portion 133R of a pin 135R. An axially inner end 137R of the pin 135R receives thereon a handle member 139R, which is retained on the inner end 137R of the pin by means of a washer 141R and snap ring 143R.

The handle member 139R defines a cam surface 145R, which is in engagement with the axially inner end portion 85R of the actuation member 83R, in the manner previously described. Although the handle members 139R and 139L are drawn substantially identical (but mirror image) in FIG. 7, it is intended in FIG. 7 to illustrate different rotational positions of the handles 139R and 139L by showing engagement of the inner end portions 85R and 85L with different locations on the cam surfaces 145R and 145L, respectively. Thus, it may be seen in FIG. 7 that the cross-section of the handle member adjacent the cam surface 145L is somewhat thinner than that adjacent the cam surface 145R, indicating that the engagement of the inner end portion 85L of the actuation member 83L is toward the "bottom" of the cam surface 145L, thus resulting in the disengaged condition of the friction pad 109 of the motor axle assembly 17. By way of contrast, the engagement of the inner end portion 85R of the actuation member 83R is further toward the "top" of the cam surface 145R, such that the friction pad 109 of the motor axle assembly 15 is in braking engagement with the actuation member 83R, and also with the reaction plate 115.

Another function which is possible with the independent braking arrangement shown in FIG. 7 is the ability to achieve a form of slip limiting differentiation between the motor axle assemblies 15 and 17. Referring still to FIG. 7, if the vehicle were operating on a hillside with the left wheel located downhill, and the right wheel located uphill, partial actuation of the handle member 139R would retard rotation of the rotor 37 in the right motor axle assembly 15. The result would be to direct a greater proportion of the fluid from the pump 11 to the left motor axle assembly 17, thus driving the left wheel which, because it is located on the downhill side, inherently has the better traction than the right wheel. Operation in this mode should be only intermittent, or for short distances, to avoid excessive heat build-up.

FIG. 8 Embodiment

Figure 8:
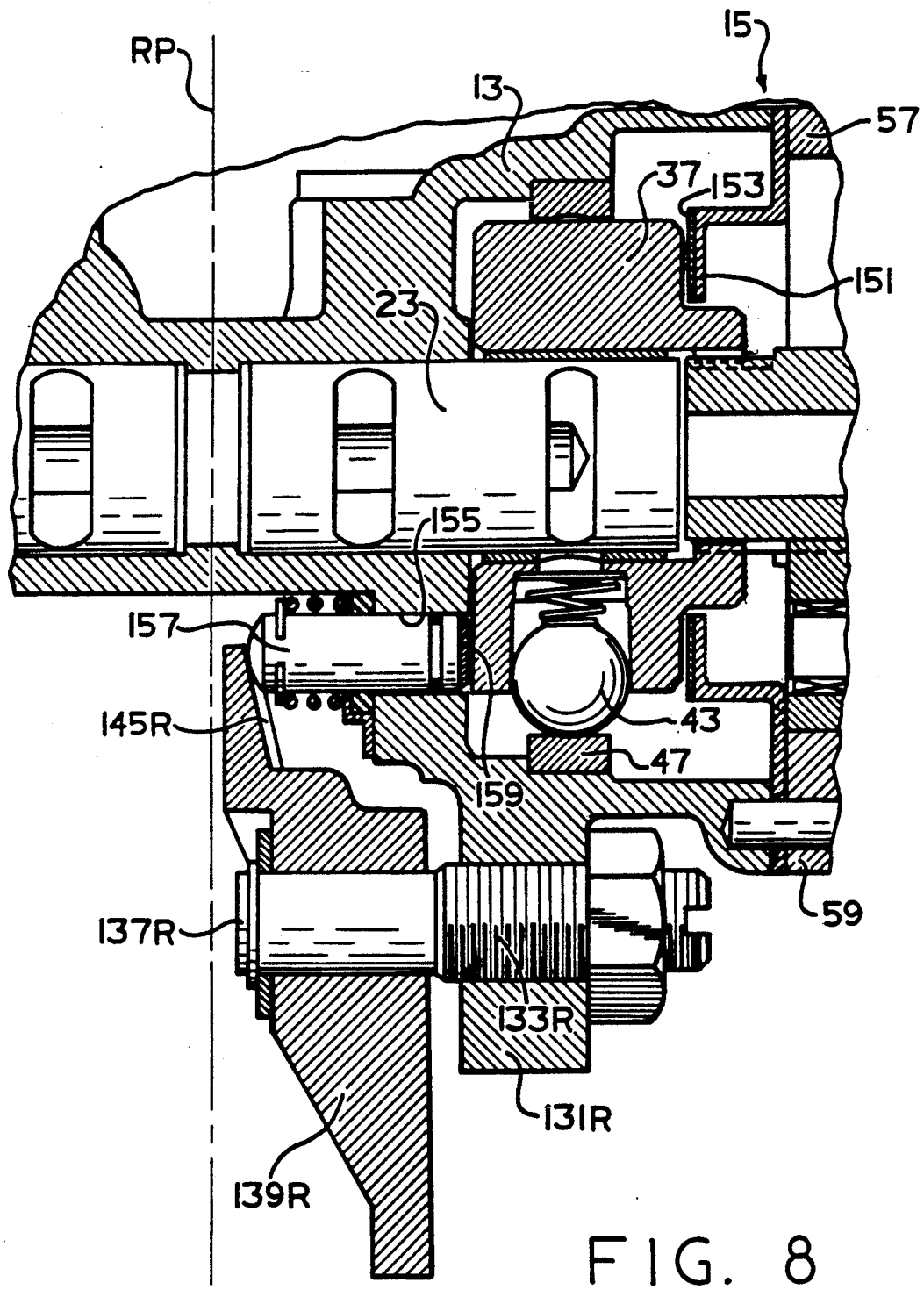
FIG. 8 is an axial cross-section, similar to FIG. 3, illustrating an alternative embodiment of the present invention.

Referring now to FIG. 8, there is illustrated another embodiment of the present invention, and in which only the elements of the right motor axle assembly 15 are illustrated and described, it being understood that the elements of the left motor axle assembly 17 would be substantially identical (but in a mirror image).

In the embodiment of FIG. 8, the rotor 37 of the motor assembly 35 becomes a direct part of the braking arrangement, and serves a function similar to that of the reaction plate 115 of the primary embodiment. In FIG. 8, elements which are the same or substantially the same as elements already introduced bear the reference numerals of those previously-introduced elements, while new elements bear reference numerals in excess of 150.

Disposed to the right of the rotor 37 is a back-up plate 151, and a layer of a suitable friction material 153 is bonded to the lefthand face of the plate 151, adjacent the rotor 37. The reaction plate 151 is trapped between the manifold casting 13 and the ring gear 57 and thus, is stationary.

The manifold casting 13 defines an elongated opening 155, within which is disposed an elongated actuation member 157, which may be substantially identical to the actuation members in the previous embodiments, but shorter. The axially outer end of the actuation member 157 includes a pad of a suitable friction material 159.

When the handle member 139R is rotated to the position shown in FIG. 8, the engagement of the cam surface 145R and the actuation member 157 forces the actuation member axially outward, pressing the friction material 159 into engagement with the adjacent surface of the rotor 37, and at the same time, pressing the right end surface of the rotor into engagement with the friction material 153 on the backup plate 151, thus retarding rotation of the rotor 37. The braking action described above with reference to FIG. 8 will result in some axial movement of the rotor 37 relative to the pintle 23, and more importantly, relative to the race 47. However, it is believed that, within the ability of those skilled in the art, the various assembly tolerances involved can be selected such that the relative axial movement between the balls 43 and race 47 can be held within an acceptable range.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

We claim:

1. A hydrostatic transaxle assembly for use on a vehicle having a source of motive power, a fluid pump driven by the source of power, and a pair of driven wheels; said transaxle assembly comprising manifold means and first and second motor assemblies; said manifold means defining a fluid inlet, adapted to be in fluid communication with a fluid port of the fluid pump, said manifold means further defining a fluid outlet, adapted to be in fluid communication with another fluid port of the fluid pump; each of said first and second motor assemblies including a rotary fluid pressure actuated device adapted to receive pressurized fluid from said fluid inlet, and to return exhaust fluid to said fluid outlet; each of said motor assemblies further including a rotatable output member having a speed of rotation representative of the speed of rotation of the respective motor assembly; each of said motor assemblies including an axle shaft adapted to transmit torque from said first and second motor assemblies to the pair of driven wheels; said manifold means defining a central reference plane (RP), said manifold means and said first and second motor assemblies being disposed oppositely and generally symmetrically relative to said central reference plane (RP); characterized by:
   (a) each of said first and second motor assemblies including friction brake means operably associated with said output member, and disposed adjacent thereto;
   (b) said manifold means defining first and second aligned openings, disposed generally symmetrically relative to said central reference plane (RP);
   (c) first and second elongated brake actuation members disposed in said first and second aligned openings, respectively, each of said brake actuation members having an axially inner end disposed toward said central reference plane (RP), and being axially movable in its respective opening, away from said central reference plane (RP);
   (d) each of said motor assemblies being operable, in response to said axial movement of its respective brake actuation member, to achieve engagement of its respective output member and said friction brake means, thereby braking rotation of said output member; and
   (e) cam means disposed adjacent said central reference plane (RP), and defining first and second cam surfaces adapted to be in engagement with the axially inner ends of said first and second brake actuation members, respectively, said cam means being movable between a first position in which said brake actuation member is out of braking engagement, and a second position in which said brake actuation member is in braking engagement.

2. A transaxle assembly as claimed in claim 1 characterized by each of said rotary fluid pressure actuated devices comprising a radial piston fluid motor including a cam ring, and a rotor member, said rotor member defining a plurality of radial bores, and a piston member disposed in each of said bores.

3. A transaxle assembly as claimed in claim 2 characterized by said friction brake means being disposed axially adjacent said rotor member, and on axially opposite sides thereof, said rotor member being disposed axially between said brake actuation member and said friction brake means.

4. A transaxle assembly as claimed in claim 1 characterized by each of said rotary fluid pressure actuated devices comprising a high-speed, low-torque displacement mechanism, and each of said first and second motor assemblies further comprising a speed reduction gear set.

5. A transaxle assembly as claimed in claim 4 characterized by said friction brake means being disposed upstream of said speed reduction gear set.

6. A transaxle assembly as claimed in claim 5 characterized by said speed reduction gear set includes an input sun gear, said input sun gear being in engagement with said output member.

7. A transaxle assembly as claimed in claim 6 characterized by said friction brake means comprising a friction pad member disposed axially between said output member and said brake actuation member.

8. A transaxle assembly as claimed in claim 1 characterized by said first and second elongated brake actuation members each having biasing means associated therewith, and operable to bias said brake actuation members axially toward said central reference plane (RP), and into engagement with said first and second cam surfaces, respectively.

9. A transaxle assembly as claimed in claim 1 characterized by said cam means comprising first and second cam members, defining said first and second cam surfaces, respectively, each of said first and second cam members being movable, independently of the other, between said first position and said second position.

10. A hydrostatic transaxle assembly for use on a vehicle having a source of motive power, a fluid pump driven by the source of power, and a pair of driven wheels; said transaxle assembly comprising manifold means and first and second motor assemblies; said manifold means defining a fluid inlet, adapted to be in fluid communication with a fluid port of the fluid pump, said manifold means further defining a fluid outlet, adapted to be in fluid communication with another fluid port of the fluid pump; each of said first and second motor assemblies including a rotary fluid pressure actuated device adapted to receive pressurized fluid from said fluid inlet, and to return exhaust fluid to said fluid outlet; each of said motor assemblies further including a rotatable output member having a speed of rotation representative of the speed of rotation of the respective motor assembly; each of said motor assemblies including an axle shaft adapted to transmit torque from said first and second motor assemblies to the pair of driven wheels; characterized by:

(a) each of said first and second motor assemblies including friction brake means operably associated with said output member and disposed adjacent thereto;

(b) said manifold means defining first and second aligned openings, and first and second elongated brake actuation members disposed in said first and second aligned openings, and axially movable therein respectively;

(c) each of said motor assemblies being operable, in response to said axial movement of its respective brake actuation member, to achieve engagement of its respective output member and said friction brake means, thereby braking rotation of said output member; and (d) cam means comprising first and second cam members defining first and second cam surfaces adapted to be in engagement with said first and second brake actuation members, respectively, each of said cam members being moveable, independently of the other, between a first position in which said brake actuation member is out of braking engagement, and a second position in which said brake actuation member is in braking engagement.

11. A transaxle assembly as claimed in claim 10 characterized by each of said rotary fluid pressure actuated devices comprising a high-speed, low-torque displacement mechanism, and each of said first and second motor assemblies further comprising a speed reduction gear set.

12. A transaxle assembly as claimed in claim 11 characterized by said friction brake means being disposed upstream of said speed reduction gear set.

13. A hydrostatic transaxle assembly for use on a vehicle having a source of motive power, a fluid pump driven by the source of power, and a pair of driven wheels; said transaxle assembly comprising manifold means and first and second motor assemblies; said manifold means defining a fluid inlet, adapted to be in fluid communication with a fluid port of the fluid pump, said manifold means further defining a fluid outlet, adapted to be in fluid communication with another fluid port of the fluid pump; each of said first and second motor assemblies including a rotary fluid pressure actuated device adapted to receive pressurized fluid from said fluid inlet, and to return exhaust fluid to said fluid outlet; each of said rotary fluid pressure actuated devices including a rotor member, and each of said motor assemblies including an axle shaft adapted to transmit torque from said rotor member to the respective driven wheel; characterized by:

(a) each of said first and second motor assemblies including a friction brake member disposed adjacent said rotor member;

(b) said manifold means defining first and second aligned openings, and an elongated brake actuation member disposed in said aligned openings, each of said brake actuation members having an axially inner end disposed away from its respective rotor member, and being axially moveable in its respective opening axially toward its respective rotor member;

(c) each of said rotor members being disposed axially between said brake actuation member and said friction member and operable in response to axial movement of the respective brake actuation member for engaging the respective friction brake member, thereby braking rotation of said rotor member; and (d) cam means including first and second cam members defining first and second cam surfaces, respectively, in engagement with the axially inner ends of said brake actuation members, respectively, each cam member being moveable between a first position in which said brake actuation member is out of braking engagement with said rotor member, and a second position in which said brake actuation member is in braking engagement with said rotor member.

14. A transaxle assembly as claimed in claim 13 characterized by each of said rotary fluid pressure actuated devices comprising a high-speed, low-torque displacement mechanism, and each of said first and second motor assemblies further comprising a speed reduction gear set.

15. A transaxle assembly as claimed in claim 14 characterized by said friction brake member being disposed upstream of said speed reduction gear set.

* * * * *